United States Patent Office

3,293,043
Patented Dec. 20, 1966

3,293,043
UNBAKED BAKERY PRODUCTS FOR REFRIGERATOR STORAGE COATED WITH ACETYLATED MONOGLYCERIDES
Samuel A. Matz, Liverpool, Robert E. Duncan, Marcellus, and Donald E. Mook, De Witt, N.Y., assignors to The Borden Company, New York, N.Y., a corporation of New Jersey
No Drawing. Filed Jan. 8, 1964, Ser. No. 336,354
2 Claims. (Cl. 99—92)

This invention relates to refrigerated bakery foods and has particular reference to the packaging together of refrigerated doughs and baking adjuncts which are intended to be baked with the dough.

The preparation and packaging of preleavened refrigerated doughs, batters and puff pastes is well known in the baking art. However, the packaging with refrigerated doughs, for example, of baking adjuncts such as icing, blocks of cheese, compressed streusel, pie fillings or the like, has not been satisfactory. Such baking adjuncts are normally incompatible with refrigerated doughs because of the differences in equilibrium relative humidities at the temperatures of storage. The difference in humidities results in translocation of moisture and deterioration of both the dough and adjunct. Heretofore, it has been necessary to package the baking adjunct separately from refrigerated dough resulting in greater expense and inconvenience in preparation.

Attempts to eliminate separate packaging of the adjuncts by coating them with moisture impervious materials such as waxes, fats, oils, greases, and the like have not been satisfactory. The materials used fail to prevent moisture translocation or possess undesirable organoleptic or nutritional properties (i.e., they may be non-nutritional).

It has now been found that canned refrigerated unbaked bakery foods packaged with baking adjuncts can be prepared which will not deteriorate on storage due to translocation of moisture.

The present invention comprises a refrigerated unbaked bakery food packaged with a baking adjunct, said adjunct being coated with an acetylated monoglyceride of a type which is solid or semi-solid at room temperature. The invention also comprises the method of making such products.

As to materials, the refrigerated unbaked bakery food may be made in any well known conventional manner such as described in the Erekson et al. Patent No. 2,942,988 and the Matz text entitled "Bakery Technology and Engineering" (1960) published by the AVI Publishing Company, Inc., and may be chemically leavened or unleavened. As used herein the terms "refrigerated unbaked bakery food" and "unbaked bakery foods" are meant to include doughs, batters, and puff pastes for making buns, rolls, other breads, pastry, and the like products meant to be kept under refrigerated storage (not frozen) and subsequently baked.

"Baking adjuncts" as used herein, means icing, blocks of cheese, compressed streusel, pie fillings, such as cherry, apple, and the like, and other edible materials commonly used as coverings and/or fillings to make pies, turnovers, tarts, cinnamon buns, and the like bakery products. "Baking adjuncts" is intended as a generic expression of all moisture deterioratable edible materials used on or as fillings in bakery foods to distinguish from materials that are used to form the doughs, batters, or pastes. There is no criticality in the formulation of the doughs, batters, and pastes as to materials used therein or the proportions thereof, nor for the baking adjuncts.

The acetylated monoglycerides used are derived fats in which acetic acid is one of the fatty acids present. Those preferred are ones that are solid or semi-solid at room temperature and have a melting point of about 100° F. These are ordinarily made by acetylating hydrogenated animal and vegetable fats and oils by (a) interesterification of edible fats and triacetin in the presence of certain catalytic agents followed by molecular distillation, or (b) the direct acetylation of edible monoglycerides with acetic anhydride with the removal by vacuum distillation of acetic acid, acetic anhydride, and triacetin. The fatty acid moieties are identical with those in hydrogenated animal and vegetable fats and oils and correspond to a distilled monoglyceride in which approximately two-thirds of the free hydroxyl groups have been acetylated. Since the natural raw materials, such as lard and cottonseed oil, vary somewhat in properties the acetylated monoglycerides will reflect the variations and the melting point, for example, for acetylated lard may vary from 99° to 104° F. Moreover, the term "acetylated monoglyceride" as used herein is meant to include both the single acetylated monoglyceride and the mixture of different monoglycerides that have been acetylated as would be present when acetylating hydrogenated lard or cottonseed oil, among others.

As to proportions, the acetylated monoglyceride is used in the proportion of about 1 to about 20 parts by weight for every 100 parts by weight of the baking adjunct coated.

In accordance with the present invention the baking adjunct is hardened, by cooling or freezing if necessary, into the shape in which it is to be packaged with the dough. After it is hardened it is completely and uniformly coated with the acetylated monoglyceride either by spraying the molten monoglyceride thereover or by immersing the solidified baking adjunct into the molten monoglyceride. The coating of acetylated monoglycerides solidifies rapidly at room temperature but may be chilled to improve its handling properties if desired. Because of their excellent water barrier characteristics the coatings need only be of a few molecules in thickness, but can be thicker if greater mechanical strength is desired.

The refrigerated dough, batter, or paste is prepared and formed into the desired shape, the pieces of dough and pieces of coated baking adjunct are then packaged together in a suitable container. The container is sealed and the product stored under refrigeration temperatures until ready for use.

The invention will be further illustrated by the following specific examples or the practice of it. In these examples, and elsewhere herein, proportions are expressed as parts by weight.

*Example 1*

An icing was formed by heating together 150 parts powdered sugar, 60 parts dark brown sugar, 60 parts corn syrup, 99 parts margarine, 7.5 parts milk solids not fat, and 1.5 grams salts. While the icing was still in the molten state it was formed into discs weighting about 8 grams and measuring about 1½ inches in diameter. The discs were chilled in a refrigerator until the temperature reached 35–40° F. and were then dipped into a liquefied acetylated monoglyceride (Myvacet 7–00) at a temperature of about 100° F. in such a manner that they were completely coated with the monoglyceride. The coating solidified rapidly at room temperature.

Meanwhile, a refrigerated dough product resembling cinnamon rolls in composition and form had been prepared and cut into pieces weighing 32 to 34 grams. These pieces were approximately 1½ inches in diameter and one inch high. Six of the dough pieces and six of the icing discs were placed on a scoop (alternating icing and dough pieces), the scoop inserted into a refrigerated dough can measuring about 1¾ inches in diameter by six inches long, the scoop withdrawn, leaving the rolls and icing inside the can, and the can sealed. The dough was allowed to "proof" in the manner well known to the trade, and then stored at 40° F. until used.

Upon opening the can after storage we find that the discs facilitated separation of the dough pieces and that, as a rule, the discs adhered to the dough pieces so that one disc is removed with one dough piece. In cases were two discs adhered to one dough piece, the additional disc was easily removed and transferred to another dough piece. The dough and icing disc combinations were placed in muffin cups with the icing disc part down and baked, e.g., at 325° F. for 22 minutes. The muffin cups were then inverted, allowing the cinnamon roll to drop out. Upon examination the icing was found to have melted and coated the roll evenly. There was no evidence at this stage of the coating of acetylated monoglycerides.

The quality of the icing disc was maintained through at least 8 weeks of storage at 40° F. Products prepared in an identical manner, except that the icing discs were not coated, showed a small accumulation of sticky liquid around the icing at the end of one day's storage. At the end of one week copious amounts of fluid were present throughout the can and the dough properties were destroyed.

*Example 2*

A cherry filling was prepared by cooking together for five minutes ten quarts of pitted cherries, ten cups of sugar, 10 tablespoons of starch, and sufficient water to keep the mixture from burning. The cooked filling was then cooled and chilled under refrigeration. Teaspoonfuls of the chilled cherry filling were placed on waxed paper or silicone-treated paper squares for easy handling and then transferred to a freezer maintained at about 0° F. When the filling portions were firm enough to be handled without distortion, they were removed from the freezer and dipped in molten Myvacet 7–00 which was maintained at about 100° F. Dipping was conducted in such a manner that the filling portion was completely covered with a film of acetylated monoglyceride.

Meanwhile, thin, square sheets of a turnover pastry dough had been prepared by mixing together 100 parts of flour, 1.5 parts of salt, 25 parts of margarine, 47.5 parts of water, and 0.2 parts of sodium benzoate until a homogeneous dough was formed. The dough was formed into a rectangular sheet and a sheet of roll-in type shortening (500 parts) was placed on two-thirds of the upper surface of the dough sheet. The dough is then folded to provide a sandwich configuration which includes three layers of dough and two interleaved layers of shortening. The folded dough product was then passed through sheeting rolls and refolded until a sheet of about 3 to 5 mm. in thickness was formed having multiple layers of dough with layers of shortening between each dough layer. The dough sheet was cut into diamond-shaped pieces which measured about 6 inches in the long axis and 5¼ inches in the short axis. The coated filling, which had been chilled to improve its handling qualities, was placed in the center of the diamond-shaped pieces which were then folded over in the usual manner so as to completely enclose the filling.

The completed turnovers were then packaged in foil baking pans which were flushed with nitrogen and hermetically sealed with a plastic film impervious to nitrogen. Upon baking after storage at 40° F., the turnovers resemble those baked from fresh ingredients in all essential respects.

This technique is, of course, applicable to any kind of refrigerated turnover product having any kind of filling such as blueberry, pineapple, apple, strawberry, and the like.

While not completely understood, it is believed that the acetylated monoglycerides prevent moisture translocation where other materials and methods have failed due to the fact that acetylated monoglycerides are flexible and plastic and will not flow or fracture to permit water vapor to penetrate into the coated adjunct.

The present invention eliminates the need for packing bakery foods and baking adjuncts in separate containers or if packed in the same container, eliminates the need for mechanical means, such as liners, to physically separate the two components into separate compartments of the container.

It will be understood that it is intended to cover all changes and modifictions of the examples of the invention herein chosen for the purpose of illustration which do not constitute departures from the spirit and scope of the invention.

We claim:

1. The method of making a packaged unbaked bakery product for refrigerated storage and subsequent baking comprising the steps of temporarily hardening a baking adjunct into the shape desired, completely coating the adjunct with an acetylated monoglyceride, and placing the coated adjunct into a container in contact with a shaped piece of unbaked bakery food.

2. The method of making a packaged unbaked bakery product for refrigerated storage and subsequent baking comprising the steps of cooling a baking adjunct to harden it to the shape desired, completely coating the adjunct with from about 1 to about 20 parts by weight of an acetylated monoglyceride for each 100 parts by weight of adjunct, and placing the coated adjuncts into a container in contact with a shaped piece of dough.

References Cited by the Examiner

UNITED STATES PATENTS 2,547,206  4/1951  Hanau _____ 99—92

OTHER REFERENCES

Feuge, R. O., Acetoglycerides—New Fat Products of Potential Value to the Food Industry. In Food Technology, 1955, vol. II, No. 6, pp. 314–318, TX 341. F 87.

A. LOUIS MONACELL, *Primary Examiner.*

RAYMOND N. JONES, *Examiner.*